United States Patent [19]

Cunningham

[11] 4,397,338

[45] Aug. 9, 1983

[54] HEAT RESISTANT PROTECTIVE COATING

[75] Inventor: Glenn R. Cunningham, Pittsburgh, Pa.

[73] Assignee: Cunningham & Thompson, Inc., Pittsburgh, Pa.

[21] Appl. No.: 317,181

[22] Filed: Nov. 2, 1981

[51] Int. Cl.³ ............................ F16L 9/14; C04B 31/00
[52] U.S. Cl. ....................................... 138/145; 138/149; 138/DIG. 9; 106/75; 501/84; 428/36
[58] Field of Search ........................... 106/75; 501/84; 138/145, 149, DIG. 9; 428/36

[56] References Cited

U.S. PATENT DOCUMENTS

| | | | |
|---|---|---|---|
| 3,095,312 | 6/1963 | Holmes | 501/84 |
| 3,268,350 | 8/1966 | Grebe et al. | 501/84 |
| 3,652,310 | 3/1972 | Kraemer et al. | 106/120 |
| 3,663,249 | 5/1972 | Rao | 106/75 |
| 3,741,898 | 6/1973 | Mallow et al. | 252/62 |
| 3,850,650 | 11/1974 | Von Bonin et al. | 106/75 |
| 3,951,834 | 4/1976 | Gillilan | 252/62 |
| 3,961,972 | 6/1976 | Sparlin et al. | 106/75 |
| 3,990,901 | 11/1976 | Engstrom et al. | 106/75 |
| 4,069,284 | 1/1978 | Niimi et al. | 264/43 |
| 4,071,480 | 1/1978 | Rademachers | 260/2.5 F |
| 4,084,980 | 4/1978 | Motoki | 106/75 |
| 4,100,115 | 7/1978 | Baer | 521/83 |
| 4,162,166 | 7/1979 | Walls-Muycelo | 106/40 R |
| 4,171,985 | 10/1979 | Motoki et al. | 106/40 R |
| 4,263,365 | 4/1981 | Burgess et al. | 106/75 |

*Primary Examiner*—William R. Dixon, Jr.
*Attorney, Agent, or Firm*—Webb, Burden, Robinson & Webb

[57] ABSTRACT

A heat resistant protective coating is comprised of a composition including 14 to 21 percent by weight of an alkali metal silicate; 20 to 35 percent by weight of magnesium silicate; a blowing agent; and water. The composition upon heating intumesces to form a closed cell structure which provides insulation to a coated substrate.

The coating composition is particularly useful in coating steel pipe to form an intumesced closed cell composition on the steel pipe. The pipe can be used as an oxygen lance in producing steel or as an aluminum flux rod.

13 Claims, No Drawings

HEAT RESISTANT PROTECTIVE COATING

BACKGROUND OF THE INVENTION

1. Field of the Invention

This invention relates to intumesced coatings and more particularly to intumesced closed cell coatings for pipe.

2. Description of the Prior Art

The term sodium silicate denotes a compound represented by the formula $Na_2O.(SiO_2)_n.xH_2O$ wherein n is any number from 1–5 and x is the number 1 or larger. Foamed (intumesced) products formed from sodium silicate are known in the art, e.g., see U.S. Pat. No. 3,741,898 and U.S. Pat. No. 3,951,834. These foam products are used as structural and insulation materials. The products' resistance to high temperature and moisture together with low thermal conductivity and excellent mechanical strength makes them especially suited for insulation. In addition, foam ceramics and shaped articles are formed from aqueous mixtures containing alkali metal silicates, which on heating to a temperature between 700°–1100° C., form a sintered porous mass. More particularly, sodium silicate, which is known as waterglass, has been known to produce porous products by heating aqueous mixtures containing such waterglass and mineral granules of different types. Further, cementitious materials can be added to alkali silicates to impart mechanical strength to alkali silicate foam bodies such as is disclosed in U.S. Pat. No. 4,084,980. These cementitious materials include materials consisting predominantly of at least one compound selected from the group consisting of oxides and composite oxides of alkali earth metals. Such cementitious materials include calcium silicate, Portland cement, alumina cement, lime alumina cement, lime slag cement, magnesium silicate and the like.

In another aspect of the invention, lances for use in the production of steel are subject to thermal and chemical degradation during use. Typically these lances are immersed in molten metal and slag and oxygen is delivered through the lance and into the molten metal at temperatures of about 3000° F. Since the lances are immersed in the molten metal and/or slag and the lances themselves are typically manufactured of metal, the lances are slowly consumed during the steelmaking process. One way of reducing the consumption of the lances is by jacketing the lances and providing water cooling to reduce consumability. However, this method of retarding consumption of the lances is expensive and dangerous due to the violent physical and chemical reaction if the cooling jacket bursts admitting water into the molten metal. Thus it has been desired in the steel industry to provide a lance which is protected from the heat given off by the molten metal in order to reduce lance consumption in the steelmaking process.

In the production of aluminum, flux wands are used to introduce gases such as CO, $Cl_2$, and $N_2$ into the molten aluminum bath. In order to avoid reaction of these gases and, more particularly, $Cl_2$, wands having linings and coatings of a ceramic material are used. These wands are expensive and the ceramic coating is fragile tending to chip and delaminate thus causing holes in the wand and making the wand useless for feeding the gas to the desired location in the aluminum bath.

In accordance with the present invention, an intumesced closed cell silicate is provided which adheres to steel and is particularly adaptable for use as a coating on steelmaking lances, aluminum flux wands and pipe.

BRIEF DESCRIPTION OF THE INVENTION

A foamable coating composition is comprised of 14 to 21 percent by weight alkali metal silicate; 20 to 35 percent by weight magnesium silicate; and the balance water. The coating composition is coated on a substrate and upon heating the coating forms a closed cell intumesced composition upon the coated substrate. More particularly, an oxygen lance for use in the steelmaking process or an aluminum flux wand is coated to a thickness of 3.5 to 4.0 mils with the coating composition. The pipe is coated with a continuous nonporous film of the coating composition. When the coated pipe is used in the steel or aluminum making process, the coating is heated to over 700° F. to give a closed cell coating structure at a thickness of 10 to 12 mils which has no cracks or fissures and provides an insulating film over the pipe. In the alternative the coated pipe can be heated to over 700° F. to develop the intumesced composition and then used in the steel or aluminum making process.

DETAILED DESCRIPTION OF THE INVENTION

The alkali metal silicate useful in the practice of the invention is either a sodium or potassium silicate having a weight ratio of $A_2O$ to $SiO_2$ ranging between about 1:2 to 1:4.2 wherein A is Na or K. Although sodium silicate is preferred, potassium silicate, lithium silicate, or the like may also be used. Preferably the weight ratio of $Na_2O$ to $SiO_2$ is about 1 to 3.22.

The alkali silicate concentration in aqueous media is 35 to 55 percent by weight and preferably 45 to 47 percent by weight and has a viscosity of 200 to 212 centipoise and a specific gravity of 41.4 to 41.6 degrees Baume.

The magnesium silicate useful in the practice of the invention, used at a level of 20 to 35 percent by weight, is a particulate magnesium silicate having a mean particle size of 7 to 15 microns and a pH of 9.3 to 9.7 in a 10 percent water slurry. The magnesium silicate is nonfibrous. Although the intumesced composition may be formed without a blowing agent, the blowing agent adds uniformity to the cell size of the composition along with assuring that the composition is closed cell.

The blowing agents useful in the practice of the invention can be among those known in the art. Preferably the blowing agent is a formaldehyde condensate. "Formaldehyde condensate" as used herein means and refers to condensation products of formaldehyde and amino derivatives such as urea, melamine and the like along with the low molecular weight alcohol terminated products such as iso-butylated urea formaldehyde and similar materials. The blowing agents are preferably used at a level of 0.05 to 0.10 percent by weight based on the weight of the coating composition as an aqueous solution or dispersion.

Sufficient water is added to the coating composition to provide the desired viscosity. Preferably the viscosity of the final coating composition is 68 to 78 Ku and is of a sprayable consistency.

In forming the coating compositions in accordance with the invention the alkali metal silicate, the magnesium silicate, the blowing agent and the water are mixed in a suitable vessel until homogeneous. A coloring agent such as lampblack or the like may be used to give the appropriate color to the finally processed material. After the material is homogeneous, the admixture is sprayed, brushed, or otherwise applied to the desired substrate to form a film. The film has a thickness of 2.0 to 5.0 and more preferably a thickness of 3.5 to 4 mils. The film is then cured to remove water, which is not accountable as water of hydration, at about 250°–350° F. to produce a continuous dry hard film. Subsequent to film formation the coated substrate is heated to greater than 700° F. preferably in the environment of final use of the coated substrate whereby the material foams to form a closed cell structure at a thickness of about three times the thickness of the initial film. The foam coated substrate is closed cell providing thermal insulation for the substrate and has a bulk density of preferably about 1 to 1.10 g/cc. The foamed coating is free of cracks and fissures, and has good adhesion to the metal substrate, thus providing an impervious film which thermally and chemically protects the substrate.

More particularly, the coating can be applied to pipes in general to provide high temperature insulation to protect the metal pipe structure and products flowing therethrough. More particularly, the coated pipes can be used in oxygen lances in the steelmaking process. When used to form aluminum flux rods the pipes are preferably coated on both the exterior and interior surfaces.

The following examples will more fully illustrate the process and compositions in accordance with the invention.

EXAMPLE I

To a suitable vessel was charged 46.37 parts by weight sodium silicate having a specific gravity of 41.5° Baume, a viscosity at 20° C. of 206 cps, a weight ratio of $Na_2O$ to $SiO_2$ of 1:3.22, and a solids content of 38.3 percent by weight. Along with the sodium silicate is charged 27.09 parts by weight magnesium silicate having a specific gravity of 2.8, a mean particle size of 9 microns, an oil adsorption of 34, and a pH in 10 percent water slurry of 9.5; the magnesium silicate was nonfibrous in structure. Iso-butylated urea formaldehyde of the self-condensing type at a level of 0.07 parts by weight was added along with 26.35 parts by weight of water. A silicone defoamer was added to prevent foam while mixing. The admixture was agitated until homogeneous. The admixture was sprayed on 10 ft., 6 in. sections of pipe which are typically used as oxygen lances in the steelmaking process. The coating thickness was developed at 4 to 4.5 mils dry film thickness and the coated pipe was dried for fifteen minutes at 300° F. Upon immersion of the coated pipe in molten steel the coating is heated above about 700° F. forming an intumesced closed cell structure of 12 to 13 mils provided as a coating on the pipe.

The sections of pipe were used as oxygen lances in the steelmaking process in accordance with Examples II and III.

EXAMPLE II

A molten metal charge in a basic oxygen furnace having a carbon content of 71 and a temperature of 2930° F. was blown with oxygen for four minutes in the first blow and the burnoff of the lance in accordance with the invention was 34 inches with an average burn of 8.5 inches per minute. The heat was blown a second time for one minute with a burnoff of the oxygen lance in accordance with the invention of 3.5 inches. The carbon of the heat was 63 which put the heat in specification and the heat was poured. The total blowing time using the oxygen lance in accordance with the invention was five minutes with a burnoff of 37.5 inches and an average burnoff of 7.5 inches per minute.

EXAMPLE III

Example II was repeated except that the first blow was for three minutes with a burnoff of 27 inches and an average burn of 9 inches per minute. The second blow was for two minutes with a burnoff of 10 inches yielding an average burnoff of 5 inches per minute. After the second blow, the carbon content of the heat was 63 placing the heat in specification and the heat was poured. The total blowing time was five minutes with a total burnoff of 37 inches and an average burnoff of 7.5 inches per minute.

EXAMPLE IV

A Japanese calorizing rod oxygen lance, which as supplied was coated with an alloy to dissipate heat and reduce lance consumption, was used in the process of Example II. After a first blow of 4 minutes, the lance had a burnoff of 58 inches yielding an average burnoff of 14.5 inches and after the second blow of 2 minutes the rod had a 20 inch burnoff with an average burnoff of 10 inches per minute. The carbon content of the heat was 66 and the heat was in specification and the batch was poured. Total blowing time was 6 minutes with a burnoff of 78 inches with an average burnoff of 13 inches per minute.

The Japanese calorizing rod was not coated with the heat insulated intumesced coating in accordance with the invention.

Thus it can be seen from the examples that the coating composition and intumesced coating in accordance with the invention is effective in insulating steel pipe and the like from excessive heat. Further, insulation is provided by the alkali metal silicate intumescent which is a continuous coating over the pipe at a thickness of 10 to 12 mils and having a density of 1.00 to 1.10.

Thus, although the invention has been described with respect to specific materials and specific processes, the invention is only to be limited so far as is set forth in the accompanying claims.

I claim:

1. A foamable coating composition comprising:
   14 to 21 percent by weight alkali metal silicate;
   20 to 35 percent by weight magnesium silicate; and
   the balance water.

2. The foamable coating composition of claim 1 wherein said alkali metal silicate is sodium silicate.

3. The foamable coating composition of claim 1 wherein said magnesium silicate is in particulate form.

4. The foamable coating composition of claim 1 including a blowing agent.

5. The formable coating composition of claim 4 wherein said blowing agent is present at a level of 0.05 to 0.10 percent in said coating composition.

6. The foamable coating composition of claim 4 wherein said blowing agent is a formaldehyde condensate.

7. The foamable coating composition of claim 6 wherein said formaldehyde condensate is a urea formaldehyde condensate.

8. A closed cell intumesced coating composition comprised of:

14 to 21 parts by weight alkali metal silicate; and
20 to 35 parts by weight magnesium silicate.

9. The coating composition of claim 8 wherein said alkali metal silicate is sodium silicate.

10. A pipe coated with a composition comprising:
14 to 21 parts by weight alkali metal silicate;
20 to 35 parts by weight magnesium silicate; and
the balance water.

11. The coated pipe of claim 10 wherein said alkali metal silicate is sodium silicate.

12. The coated pipe of claim 10 wherein said coating is intumesced and closed celled and having a density of 1.00 to 1.10.

13. The coated pipe of claim 10 including a blowing agent.

* * * * *